US009413624B2

(12) United States Patent
Kirkup et al.

(10) Patent No.: US 9,413,624 B2
(45) Date of Patent: Aug. 9, 2016

(54) METHOD AND DEVICE FOR PROVIDING SYSTEM STATUS INFORMATION

(75) Inventors: Michael Grant Kirkup, Waterloo (CA); Andrew Ho Yin Leung, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 712 days.

(21) Appl. No.: 13/031,773

(22) Filed: Feb. 22, 2011

(65) Prior Publication Data

US 2012/0075175 A1    Mar. 29, 2012

Related U.S. Application Data

(60) Provisional application No. 61/387,513, filed on Sep. 29, 2010.

(51) Int. Cl.
*G06F 15/173* (2006.01)
*H04L 12/26* (2006.01)
*G06F 11/30* (2006.01)

(52) U.S. Cl.
CPC ........ *H04L 43/0817* (2013.01); *G06F 11/3024* (2013.01); *G06F 11/3055* (2013.01); *G06F 11/3068* (2013.01); *G06F 11/3072* (2013.01)

(58) Field of Classification Search
CPC .. G06F 11/30; G06F 11/3055; H04L 12/2602
USPC ........................................................ 709/223
See application file for complete search history.

(56) References Cited

U.S. PATENT DOCUMENTS

| | | | |
|---|---|---|---|
| 6,473,812 B2 | 10/2002 | Motoyama | |
| 6,754,470 B2 | 6/2004 | Hendrickson et al. | |
| 6,839,717 B1 | 1/2005 | Motoyama et al. | |
| 7,302,688 B2 | 11/2007 | Shitahaku | |
| 7,401,320 B2 | 7/2008 | Brunet et al. | |
| 7,788,644 B2 | 8/2010 | Koduru et al. | |
| 2003/0055931 A1* | 3/2003 | Cravo De Almeida et al. ............................ 709/223 |
| 2004/0203755 A1 | 10/2004 | Brunet et al. | |
| 2005/0148329 A1 | 7/2005 | Brunet et al. | |
| 2006/0234639 A1 | 10/2006 | Kushwaha et al. | |
| 2007/0006154 A1 | 1/2007 | Yang et al. | |
| 2007/0179799 A1 | 8/2007 | Laghrari | |

(Continued)

FOREIGN PATENT DOCUMENTS

| | | |
|---|---|---|
| WO | 2010085022 | 6/2010 |
| WO | WO 2010085022 A1 * | 7/2010 |

OTHER PUBLICATIONS

English Translation for WO2010085022.*

(Continued)

*Primary Examiner* — Vivek Srivastava
*Assistant Examiner* — Karina J Garcia-Ching
(74) *Attorney, Agent, or Firm* — Rowand LLP

(57) ABSTRACT

The present disclosure provides a method and device for providing system status information. The method comprises: receiving, from an input mechanism associated with a communication device, a request to share system status information; and in response to receiving the request to share the system status information: (i) obtaining system status information associated with the communication device; and (ii) automatically populating one or more portions of an electronic message based on the system status information. The system status information comprises processor usage information.

20 Claims, 9 Drawing Sheets

(56) References Cited

U.S. PATENT DOCUMENTS

| | | |
|---|---|---|
| 2007/0190995 A1* | 8/2007 | Wang et al. .................. 455/419 |
| 2007/0207800 A1 | 9/2007 | Daley et al. |
| 2007/0254628 A1 | 11/2007 | Rybak |
| 2008/0085717 A1 | 4/2008 | Chhabra et al. |
| 2008/0268828 A1 | 10/2008 | Nagaraja |
| 2010/0255902 A1* | 10/2010 | Goldstein et al. .............. 463/29 |

OTHER PUBLICATIONS

Office Action dated Nov. 19, 2012 (Canadian Application No. 2,732,365).

CIPO, CA Office Action relating to Application No. 2,732,365, dated Sep. 22, 2015.

* cited by examiner

METHOD AND DEVICE FOR PROVIDING SYSTEM STATUS INFORMATION

The present application claims priority to, and the benefit of, provisional U.S. patent application Ser. No. 61/387,513 filed on Sep. 29, 2010 which is incorporated herein by reference in its entirety.

TECHNICAL FIELD

The present disclosure relates generally to application managers and, more particularly to methods and systems for providing system status information for communication devices.

BACKGROUND

Communication devices and other electronic devices may occasionally exhibit poor operating performance. The operating performance of such devices may, for example, be affected by the system status of the device, such as, for example, the memory usage of applications or processes currently running on the device, etc. In other circumstances, the operating performance of such devices may be affected by manufacturing or software defects on the device.

When electronic devices experience degraded performance, it may be difficult for a user to troubleshoot in order to resolve the problem.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present application provides a method comprising: receiving, from an input mechanism associated with a communication device, a request to share system status information; and in response to receiving the request to share the system status information: (i) obtaining system status information associated with the communication device; and (ii) automatically populating one or more portions of an electronic message based on the system status information. The system status information comprises processor usage information.

In another aspect, the present application provides a communication device comprising at least one processor and at least one memory storing computer executable instructions. The computer executable instructions are configured to cause the at least one processor to: receive, from an input mechanism associated with a communication device, a request to share system status information; and in response to receiving the request to share the system status information: (i) obtain system status information associated with the communication device; and (ii) automatically populate one or more portions of an electronic message based on the system status information. Other aspects of the present application will be apparent to those of ordinary skill in the art from a review of the following detailed description in conjunction with the drawings. The system status information comprises processor usage information.

Embodiments of the present application are not limited to any particular operating system, mobile device architecture, server architecture, or computer programming language.

The present application describes, among other things, an electronic device having a system status information module which allows a user of the device to share system status information regarding the electronic device via an electronic message.

The electronic device may, in some embodiments, be a mobile wireless device having mobile communication capabilities such as, for example, data communication capabilities. However, depending on the functionality of the device, in various embodiments, the device may be a mobile wireless device, a data communication device, a multiple-mode communication device configured for both data and voice communication, a smartphone, a mobile telephone or a PDA (personal digital assistant) enabled for wireless communication, or a computer system with a wireless modem. In embodiments in which the electronic device is enabled for communication, the device may be referred to as a communication device.

Accordingly, the device 201 (FIG. 1) may, in various instances throughout this disclosure, be referred to as a mobile device 201, a communication device 201, a mobile communication device 201, or an electronic device 201.

System Overview

Figure 1:
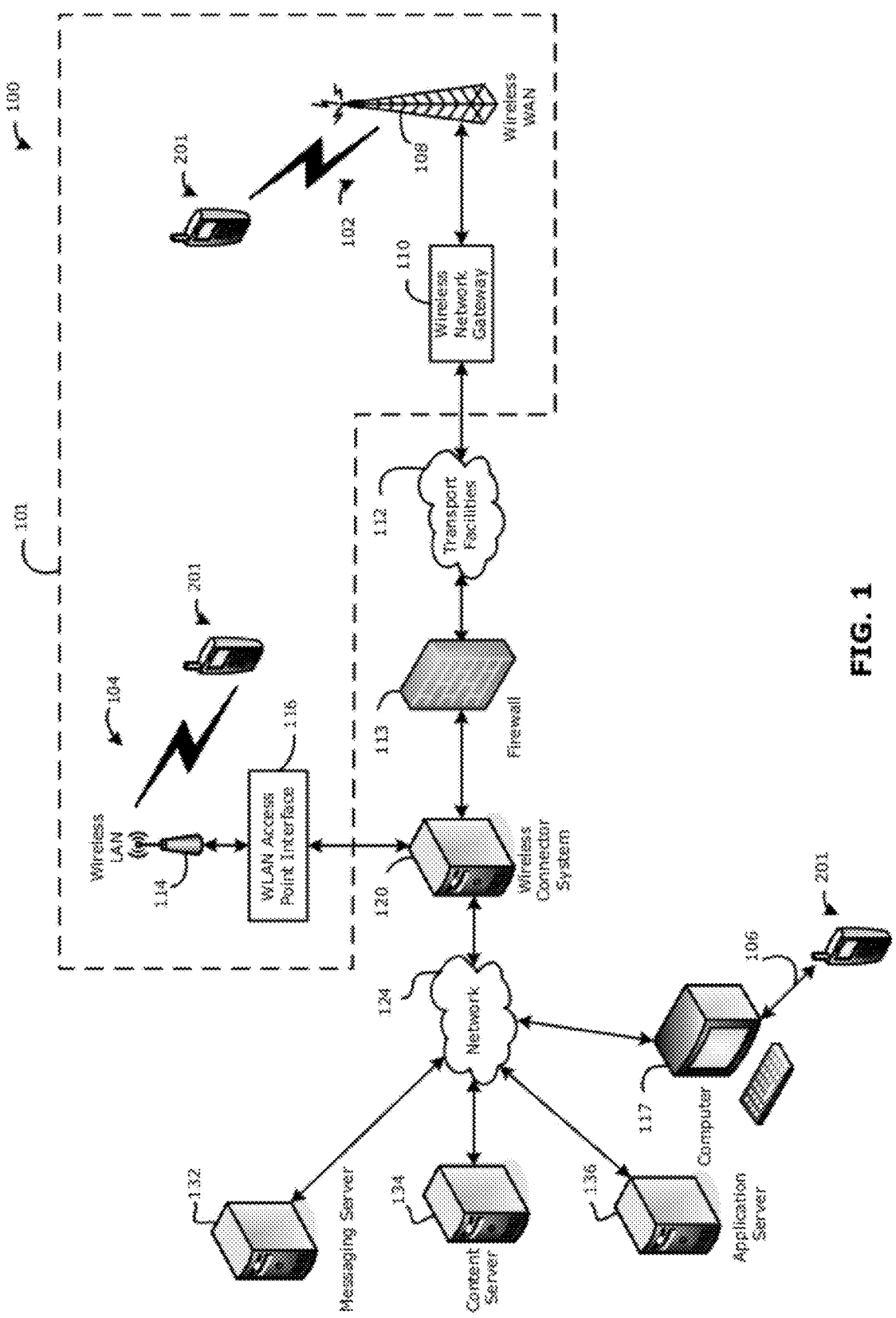
FIG. 1 is a block diagram of a communication system in which example embodiments of the present disclosure can be applied.

In order to facilitate an understanding of one possible environment in which example embodiments described herein can operate, reference is first made to FIG. 1 which shows in block diagram form a communication system 100 in which example embodiments of the present disclosure can be applied. The communication system 100 includes a number of mobile communication devices 201 which may be connected to the remainder of the system 100 in any of several different ways. Accordingly, several instances of mobile communication devices 201 are depicted in FIG. 1 employing different example ways of connecting to the system 100. Mobile communication devices 201 are connected to a wireless network 101 which may include one or more of a Wireless Wide Area Network (WWAN) 102 and a Wireless Local Area Network (WLAN) 104 or other suitable network arrangements. In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA1010, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, or application server 136. Conversely, the wireless connector system 120 sends data packets received, for example, from the messaging server 132, content server 134, or application server 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134, and application server 136.

The network 124 may include a private local area network, metropolitan area network, wide area network, the public Internet or combinations thereof and may include virtual networks constructed using any of these, alone, or in combination.

A link 106 may be provided for exchanging information between the mobile communication device 201 and a host computer 117 connected to a network 124, such as the Internet. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and host computer 117. In at least one embodiment, the link 106 is a USB connection to the mobile communication device 201.

It will be appreciated that the above-described communication system is provided for the purpose of illustration only, and that the above-described communication system includes one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Example Mobile Communication Device

Figure 2:
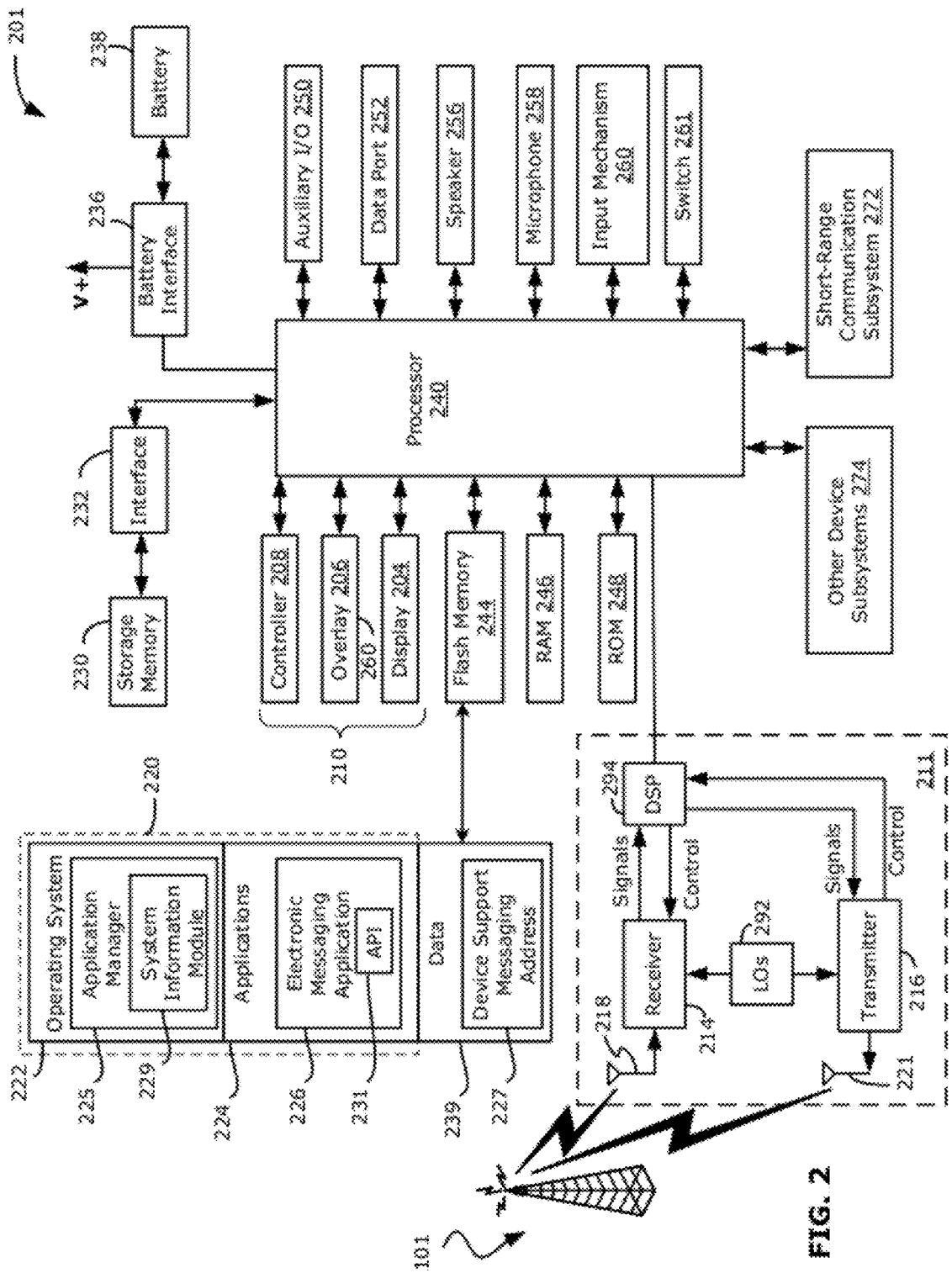
FIG. 2 is a block diagram illustrating a communication device in accordance with example embodiments of the present disclosure.

Reference is now made to FIG. 2 which illustrates a block diagram of a mobile device 201 in which example embodiments described in the present disclosure can be applied. In the embodiment shown, the mobile device 201 is a two-way mobile communication device having data and possibly also voice communication capabilities, and the capability to communicate with other computer systems, for example, via the Internet. Depending on the functionality provided by the mobile device 201, in various embodiments the device 201 may be a data communication device, a multiple-mode communication device configured for both data and voice communication, a smartphone, a mobile telephone or a PDA (personal digital assistant) enabled for wireless communication, or a computer system with a wireless modem. It will be appreciated that, in some embodiments, the systems and methods presented herein may be applied to an electronic device that does not, necessarily, have communication capabilities; such as, for example a PDA or GPS which is not enabled for communication.

The mobile device 201 includes at least one controller comprising at least one processor 240 such as a microprocessor which controls the overall operation of the mobile device 201, and a wireless communication subsystem 211 for exchanging radio frequency signals with a wireless network 101. The processor 240 interacts with the communication subsystem 211 which performs communication functions. The processor 240 interacts with additional device subsystems. In some embodiments, the device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 provide a touch-sensitive input device and the processor 240 interacts with the touch-sensitive overlay 206 via the electronic controller 208. The touch-sensitive overlay 206 acts as an input mechanism 260, allowing the user of the device 201 to input commands to the processor 240.

In some embodiments, the device 201 may include other input mechanisms 260 instead of or in addition to the touchscreen. The other input mechanisms 260 may include, for example, a depressible scroll wheel (which may also be referred to as a trackball), a touch-pad such as an optical touchpad, an optical jog ball, and/or a physical keyboard.

It will be appreciated that the specific input mechanisms 260 associated with the device 201 will vary from device-to-device. That is, some devices 201 may have a first input mechanism 260 or first set of input mechanisms 260, while other devices 260 may have a second input mechanism 260 or second set of input mechanisms 260.

The processor 240 interacts with additional device subsystems including flash memory 244, random access memory (RAM) 246, read only memory (ROM) 248, auxiliary input/output (I/O) subsystems 250, data port 252 (which may be a serial data port, such as a Universal Serial Bus (USB) data port), speaker 256, microphone 258, input mechanisms 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 292, and a processing module such as a digital signal processor (DSP) 294. The antenna elements 218 and 221 may be embedded or internal to the mobile device 201 and a single antenna may be shared by both receiver and transmitter, as is known in the art. As will be apparent to those skilled in the field of communication, the particular design of the communication subsystem 211 depends on the wireless network 101 in which the mobile device 201 is intended to operate.

The mobile device 201 may communicate with any one of a plurality of fixed transceiver base stations (not shown) of the wireless network 101 within its geographic coverage area. The mobile device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 294. In a similar manner, signals to be transmitted are processed, including modulation and encoding, for example, by the DSP 294. These DSP-processed signals are input to the transmitter 216 for digital-to-analog (D/A) conversion, frequency up conversion, filtering, amplification, and transmission to the wireless network 101 via the antenna 221. The DSP 294 not only processes communication signals, but may also provides for receiver and transmitter control. For example, the gains applied to communication signals in the receiver 214 and the transmitter 216 may be adaptively controlled through automatic gain control algorithms implemented in the DSP 294.

The processor 240 operates under stored program control and executes software modules 220 stored in memory such as persistent memory; for example, in the flash memory 244. As illustrated in FIG. 2, the software modules 220 comprise operating system software 222 and applications 224.

The applications 224 include one or more electronic messaging application 226 and may also include other applications (not shown). The electronic messaging application 226 may be an email application. The email application may, in some example embodiments, be referred to as an email client or an email reader. The email application may, in various example embodiments, permit users of the communication device 201 to view email messages, forward email messages, reply to email messages, compose email messages, and send email messages through the wireless network 101 to message recipients.

In at least some embodiments, the electronic messaging application 226 includes an application programming interface (API) 231 which is configured to allow other applications 224 to access features of the electronic messaging application 226. The API 231 allows the operating system 222 and/or other applications 224 to integrate features provided by the electronic messaging application 226 into the operating system 222 and/or the other applications 224. The API 231 is, in at least some embodiments, configured to receive instructions from other applications to populate at least a portion of an electronic message with specified data. For example, in at least some embodiments, the API 231 may be configured to receive a command from the operating system 222 or another application 224 to insert specified data, such as text data into a message body of an email message. The command may specify the data to be inserted. In response to receiving such a command, the API 231 may cause the specified data to be added to the message body of an email message. That is, the API 231 may populate the message body with the specified data (such as text data).

The API 231 may be configured to receive other commands and to execute operations associated with such other commands. For example, the API 231 may be configured to receive a command from the operating system 222 and/or other applications 224 to populate a subject field of an electronic message with specified text and to, in response, populate the subject field with the specified text. In some embodiments, the API 231 may be configured to receive a command from the operating system 222 and/or other applications 224 to populate an address field with a specified messaging address. In response, the API 231 may cause the address field of an electronic message to be populated with the specified messaging address.

In some embodiments, the API 231 may be configured to receive a command from the operating system 22 and/or other applications 224 to send an electronic message and to, in response, cause an electronic message to be sent to one or more message recipients specified by one or more messaging addresses.

It will be appreciated that the API 231 may provide for commands or functions in addition to the commands or functions specifically discussed above.

It will also be appreciated that, while the electronic messaging application 226 may, in some embodiments, be an email application, in other embodiments, the electronic messaging application 226 may be a text messaging application, such as a short messaging service (SMS) application. In other embodiments, the electronic messaging application 226 may be an instant messenger (IM) application which provides real-time direct text based communication between two or more people. In other embodiments, the electronic messaging application 226 may be a unified messaging (UM) application, which integrates multiple electronic messaging technologies into a single application. For example, the unified messaging application may integrate SMS and email messaging. It will be appreciated that the electronic messaging application 226 may be provide for electronic messaging using technologies apart from those technologies specifically discussed above.

The software modules 220 may also include an application manager application 225. In various embodiments, the application manager application 225 may also be referred to as a task manager and/or a system manager. The application manager application 225 may, in some example embodiments, be provided by the operating system 222. In other example embodiments, the application manager application 225 is a stand-alone application 224.

The application manager application 225 may, in some embodiments, be configured to provide information about processes and programs running on the communication device 201 and may, in some embodiments, be configured to provide information regarding system resource usage.

The application manager application 225 may, in some embodiments, be configured to receive specified input through an input mechanism 260 which causes the application manager application 225 to terminate one or more applications and/or processes. For example, the application manager application 225 may provide a user selectable option on a display screen which permits a user to input a command to kill a specified application and/or process. In response to receiving such a command, the application manager application 225 may terminate the specified process or application.

In at least some embodiments, the application manager application 225 includes a system status information module 229. As will be explained in greater detail below with reference to FIGS. 6 to 9, the system status information module may be configured to receive a request to share system status information from an input mechanism and to, in response, share such information with one or more other devices, systems, or recipients.

In at least some example embodiments, the system status information module 229 may be configured to display system status information on the display 204 associated with the communication device 201.

The system status information may, in various example embodiments, include system resource usage information which quantifies the amount of one or more system resources which are being used on the device. That is, the system resource usage information quantifies usage of one or more system resources on the communications device. The system resources are a part of the device 201 which may be used by a computer program, such as an application or process.

The system status information may, in at least some example embodiments, quantify the amount of memory resources (such as the flash memory 244 (FIG. 2), and/or RAM 246 (FIG. 2) and/or ROM 248 (FIG. 2) and/or storage memory 230 (FIG. 2)) which is currently used and/or available. The amount of memory resources used or available may be quantified in absolute or relative terms. For example, in some embodiments, the amount of memory resources may be quantified in terms of the total amount of memory used. For example, the amount of memory used or available may be quantified in terms of bytes used. In some example embodiments, the amount of memory used or available may be quantified in terms of the amount of memory available. For example, the amount of memory available may be quantified in terms of bytes available. In some example embodiments, the amount of memory used may be quantified in terms of the amount of memory available relative to the total amount of memory. For example, the amount of memory used may be quantified in terms of a percentage which represents the amount of memory used relative to the total memory available. Other methods of quantifying the amount of memory resources used or available are also possible.

The system status information may, in at least some example embodiments, quantify the amount of processing capacity of the processor 240 which is used and/or available. The amount of processing capacity may be quantified, for example, in terms of a percentage which represents the amount of processing capacity used relative to the total processing capacity available. Other methods of quantifying the processor 240 usage are also possible.

In at least some embodiments, the system status information may include a list of all applications currently running on the device 201. In at least some example embodiments, the system status information may include a list of all processes currently running on the device 201.

Where the system status information includes a list of applications currently running on the device, the system status information may quantify the amount of system resources used by each application. For example, the system status information may indicate the total amount of memory resources used by each application. Similarly, in at least some embodiments, the system status information may indicate the total amount of processing capacity used by each application.

Where the system status information includes a list of processes currently running on the device, the system status information may quantify the amount of system resources used by each process. For example, the system status information may indicate the total amount of memory resources used by each process. Similarly, in at least some embodiments, the system status information may indicate the total amount of processing capacity used by each process.

It will be appreciated that, while the example embodiment of FIG. 2 illustrates the system status information module 229 as being included in the application manager application 225, in other embodiments, the system status information module 229 may be included elsewhere. For example, in some embodiments, the system status information module 229 is a separate stand-alone application 224. Similarly, while FIG. 2 shows an example embodiment in which the application manager application 225 is included in the operating system 222, in other embodiments, the application manager application 225 may be a separate application 224, such as a stand-alone application.

It will also be appreciated that the software modules 220 may include other applications 224, such as, for example, a mapping or navigation application, an Internet browser application, an address book application, a calendar application, a notepad application, a voice communication application, and/or a media player application. The software modules 220 may also include other applications apart from those specifically discussed herein. In some embodiments, the applications 224 may include layout information defining the placement of particular fields and graphic elements (e.g. text fields, input fields, icons, etc.) in the user interface (i.e. the display device 204).

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In addition to software modules 220, the memory may also include data 239. The data may include user-data such as address books, saved documents, etc. In at least some embodiments, the data 239 includes a device support messaging address 227. The system status information module 229 may be configured to share the system status information with a message recipient identified by the device support messaging address 227.

In some embodiments, the auxiliary input/output (I/O) subsystems 250 of the mobile device 201 may comprise an external communication link or interface, for example, an Ethernet connection. The mobile device 201 may comprise other wireless communication interfaces for communicating with other types of wireless networks: for example, a wireless network such as an orthogonal frequency division multiplexed (OFDM) network. The auxiliary I/O subsystems 250 may comprise a vibrator for providing vibratory notifications in response to various events on the mobile device 201 such as receipt of a wireless communication or incoming phone call, or for other purposes such as haptic feedback (touch feedback).

The mobile device 201 also includes a storage memory 230. The storage memory may, in various example embodiments, be comprised of a removable memory card (typically comprising flash memory), such as, for example, a Secure Digital (SD), mini Secure Digital (miniSD), micro Secure Digital (microSD), or CompactFlash™ card. In some embodiments, the storage memory 230 may be comprised of an internal (non-removable) memory which is designated by the operating system as storage memory. For example, the storage memory 230 may be e-MMC™ memory. The storage memory 230 is inserted in or connected to a storage memory interface 232 of the mobile device 201.

The data port 252 may be used for synchronization with a user's host computer system 117 (FIG. 1). The data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

The mobile device 201 also includes a battery 238 as a power source, which is typically one or more rechargeable batteries that may be charged, for example, through charging circuitry coupled to a battery interface such as the data port 252. The battery 238 provides electrical power to at least some of the electrical circuitry in the mobile device 201, and a battery interface 236 provides a mechanical and electrical connection for the battery 238. The battery interface 236 is coupled to a regulator (not shown) which provides power V+ to the circuitry of the mobile device 201.

The short-range communication subsystem 272 is an additional optional component which provides for communication between the mobile device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 221 or software applications 224 may also be loaded onto the mobile device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the application memory 241 (i.e. the flash memory 244), or written into and executed from the RAM 246 for execution by the processor 240 at runtime.

The mobile device 201 may, in some example embodiments, provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 204. A user of the mobile device 201 may also compose data items, such as email messages, for example, using the touch-sensitive overlay 206 in conjunction with the display device 204 and possibly the input mechanism 260 and/or the auxiliary I/O subsystems 250. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile wireless device 201. Although voice or audio signal output is typically accomplished primarily through the speaker 256, the display device 204 may also be used to provide an indication of the identity of a calling party, duration of a voice call, or other voice call related information.

System Status Information Screen

In at least some embodiments, the system status information module 229 may be configured to display a system status information screen which identifies system status information and/or which provides a user selectable interface element, such as an icon or command button, which permits a user to input a request to share system information.

Figure 3:
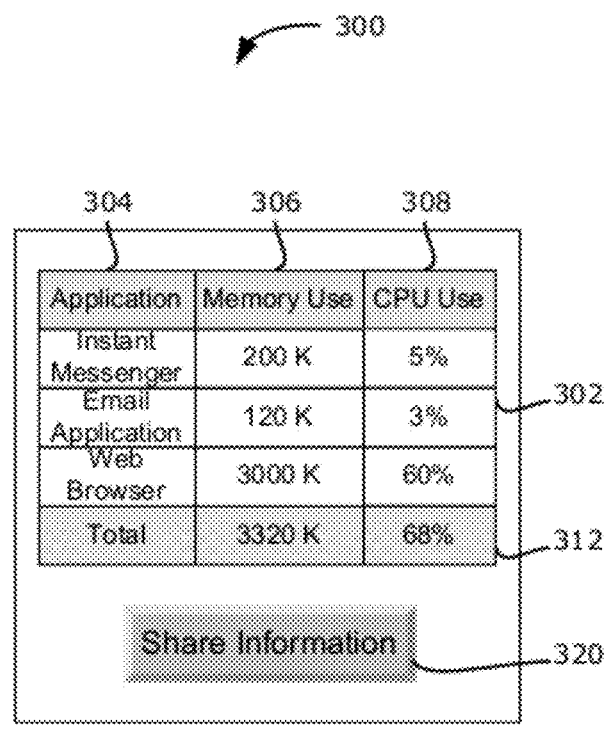
FIG. 3 is an example system status information screen in accordance with example embodiments of the present disclosure.

Referring now to FIG. 3, an example system status information screen 300 is illustrated. The example system status information screen 300 may be displayed in the display 204 (FIG. 2) of the mobile device 201 (FIG. 2). The example system status information screen 300 may, in some embodiments, occupy all of the screen area of the display 204. In other embodiments, the system status information screen 300 may be displayed within another window or screen.

The system status information screen 300 includes, in at least some embodiments, a system status information display area 302 which is used to display system status information. The system status information may include, for example, resource usage information, which quantifies resource usage, such as memory usage and/or processor usage.

The resources may include, for example, memory resources (such as the flash memory 244, and/or RAM 246 and/or ROM 248 and/or storage memory 230). In such embodiments, the resource usage information may indicate the amount of memory resources which are consumed and/or the amount of memory resources which are available (i.e. not used).

The resources may also include, for example, one or more processor. In such embodiments, the resource usage information may indicate the amount of processor resources which are consumed and/or the amount of processor resources which are available (i.e. not used).

In at least some embodiments, the resource usage information may be defined on a per-application basis. That is, the resource usage information may indicate the portion of one or more resources which are consumed by each application running on the device 201. In such embodiments (an example of which is illustrated in FIG. 3), the system status information display area 302 may display a list 304 of applications running on the device 201 and one or more indicator 306, 308 of the amount of resources occupied by each application running on the device 201. In at least some embodiments, the indicator may be a memory usage indicator 306 which displays the amount of memory resources used by each application. In at least some embodiments, the indicator may be a processor usage indicator 308 which displays the portion of the processor's processing power which is used by the application.

In at least some embodiments, the resource usage information may be defined on an absolute basis. That is, the resource usage information may indicate the total amount of one or more resources which are occupied. For example, the resource usage information may indicate the total amount of memory resources (such as the flash memory 244, and/or RAM 246 and/or ROM 248 and/or storage memory 230) which are currently occupied. In other embodiments, the resource usage information may indicate the total amount of processor resources which are currently occupied (and/or available). In such embodiments (an example of which is illustrated in FIG. 3), the system status information display area 304 may include an indicator 312 of the total amount of resources occupied (and/or available). For example, the indicator may identify the total amount of memory resources occupied and/or the total amount of processor resources occupied (and/or available).

In at least some embodiments, the system status information screen 300 includes a selectable interface element 320 which is configured to permit the device 201 to receive input from an input mechanism 260 (FIG. 2) associated with the device 201, requesting that the device 201 share system status information. A user of the device 201 may interact with the input mechanism 260 to activate the selectable interface element 320. When a user activates the selectable interface element 320, the device 201 may interpret such activation as a request to share system status information.

The selectable interface element 320 is, in the example shown, a command button which is labelled "Share Information." However, it will be appreciated that, in other embodiments, the selectable interface element 320 may take other forms. For example, in some embodiments, the selectable interface element 320 may be a command button with another label. For example, in some embodiments, the selectable interface element 320 may be labelled "Transmit information", "Email information." "Send", etc.

It will be appreciated that, in some embodiments, other methods of receiving a request to share system information may be employed. In at least some such embodiments, a request to share system information may be received without a selectable interface element 320 being displayed. For example, a predetermined key or key combination associated with the input mechanism 260 may be associated with a request to share system information.

Figure 4:
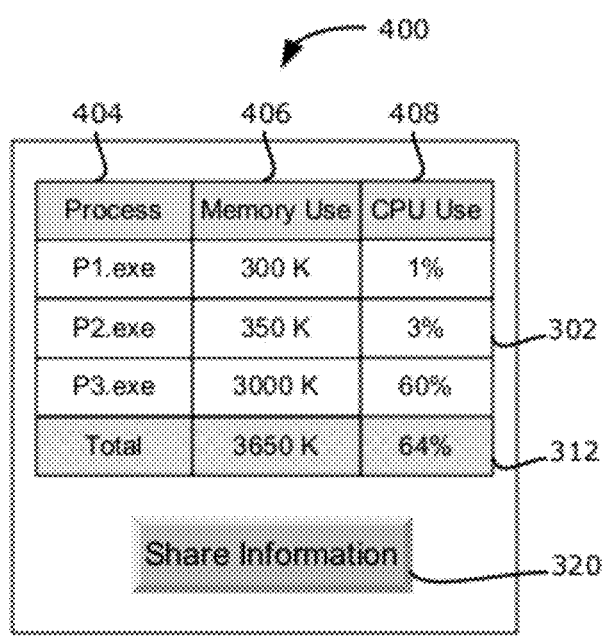
FIG. 4 is an example system status information screen in accordance with one example embodiment of the present disclosure.

Referring now to FIG. 4, a further example of a system status information screen 400 is illustrated. The example system status information screen 400 may be displayed in the display 204 (FIG. 2) of the mobile device 201 (FIG. 2).

In at least some example embodiments, resource usage information may be defined on a per-process basis. That is, the resource usage information may indicate the portion of one or more resources which are consumed by each process running on the device 201. In such embodiments (an example of which is illustrated in FIG. 4), the system status information display area 302 may display a list 404 of processes running on the device 201 and an indicator 406, 408 of the amount of resources occupied by each process running on the device 201. In at least some example embodiments, the indicator may be a memory usage indicator 406 which displays the amount of memory resources used by each process. In at least some example embodiments, the indicator may be a processor usage indicator 408 which displays the portion of the processor which is used by the application.

It will be appreciated that the device 201 may not have sufficient screen area to display, at any given time, a list of all applications and/or processes running on the device. In such embodiments, the system status information display area 302 may only display a portion of the applications and/or processes running on the device 201. Suitable scrolling techniques may be employed to permit a user to view other applications and/or processes running on the device 201.

The system status information may, in at least some embodiments, specify the time period during which each process and/or application has been using the processor. For example, the time period may be reported in terms of a number of seconds of usage. In some embodiments, the system status information may specify the amount of memory a process has been allocated by the device (such as by a Java Virtual Machine (JVM) component of the device) to create new objects.

In some embodiments, the system status information may specify the number of objects which have been allocated in memory.

In some embodiments, the system status information may specify the processes which are dead, but which are still living in memory and taking up space. Such processes may be considered memory leaks and may need to be fixed.

It will be appreciated, that, in some embodiments, the system status information screen may be configurable by a user. That is, a user may interact with an input mechanism of the device in order to input a command to the device to cause specific system status information to be displayed.

Figure 5:
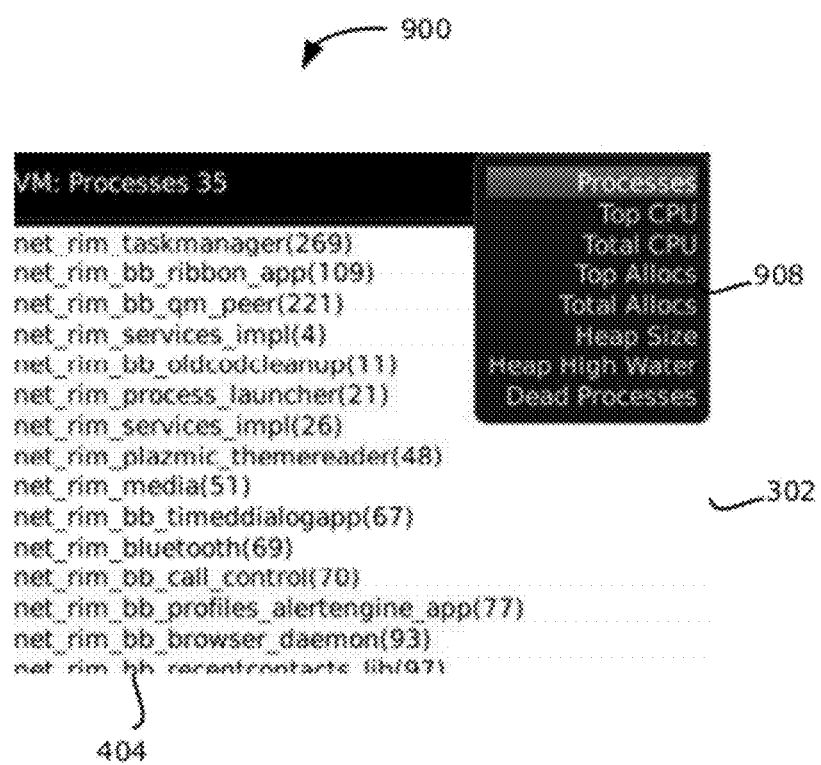
FIG. 5 is an example system status information screen in accordance with example embodiments of the present disclosure.

Referring now to FIG. 5, one such example system status information screen 900 is illustrated. The system status information screen 900 contains a selectable interface element which allows the device 201 to receive input to configure the type of information which will be displayed. In the example illustrated, the system status information screen 900 includes a selectable interface element 908 which facilitates configuration of the displayed system status information. That is, the interface element 908 may permit a user of the device 201 to select the type of system status information displayed on the system status information screen.

In the example illustrated, the system status information screen 900 includes a selectable interface element 908 which allows a user to select whether the system status information screen 900 is to display: a list of processes which are currently operating on the device 201 (i.e. by selecting "Processes"), information about the percentage of the processor processing that an application or process is currently using (i.e. by selecting "Top CPU"), information about the time period during which each process and/or application has been using the processor (i.e. by selecting "Total CPU"), information about the amount of memory that each process has been allocated to create new objects (i.e. by selecting "Heap Size"), other information about memory (i.e. by selecting "Heap High Water"), information about the number of objects that have been allocated to memory (i.e. by selecting "Total Allocations" or "Top Allocations"), information about processes which are dead but which are still living in memory and taking up space (i.e. by selecting "Dead Processes"), and information about the Heap Size of each process (i.e. by selecting "Heap Size.")

It will be appreciated that other types of system status information may, in various embodiments, be displayed on the system status information screen 908. It will also be appreciated that, in at least some embodiments, only a subset of the options discussed above with reference to FIG. 5 may be provided.

In at least some embodiments, input may be received via an input mechanism 260 associated with the device 201 which allows a user to select the type of system status information which will be shared when a request to share resource information is received. That is, a user may be permitted to specify the type of system status information which is to be sent when a request to share information is received at the device in the manner described above with reference to FIG. 4 (i.e. when a user activates the selectable interface element 320). For example, the selectable interface element 908 may be used by to define the type of information which will be shared.

Sharing System Status Information

Figure 6:
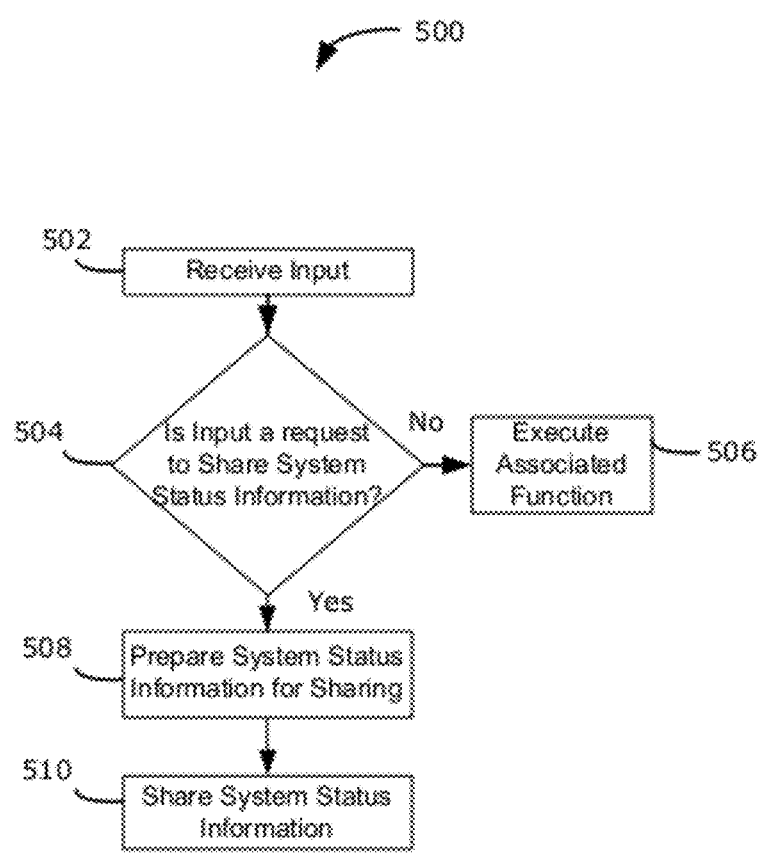
FIG. 6 is a flowchart illustrating a method for sharing system status information in accordance with example embodiments of the present disclosure.

Referring now to FIG. 6, a method 500 for sharing system status information is illustrated. The system status information may include, for example, system resource usage information, such as information regarding memory usage and or information regarding the processor usage.

The mobile device 201 (FIG. 2) may be configured to perform the method 500 of FIG. 6. More particularly, the system information module 229 and/or the application manager application 225 may be configured to cause one or more controllers of the device 201 (FIG. 2), such as the processor 240 (FIG. 2), to execute the steps of the method 500 of FIG. 6. In the following discussion of the method 500 of FIG. 6, reference numerals which relate to device or system components (as opposed to steps of a process or method), such as processor 240, refer to components such as those illustrated, by example, in FIGS. 1 to 5.

At 502, an input is received through an input mechanism 260 associated with the device 201. The input received at 502 may be received, for example, when a selectable interface element 320 (FIGS. 3 & 4) on a system status information screen 300, 400 (FIGS. 3 & 4) is activated with the input mechanism 260 (FIG. 2). It will, however, be appreciated that other methods of providing input to the device 201 are also possible.

Next, at 504, the device 201 determines whether the input received at 502 is a request to share system status information. If the input is not a request to share system status information, then at 506, the device 201 performs a function associated with the specific input if the specific input has an associated function.

If the input received at 502 is an input which is associated with a request to share system status information, then at 508, the system information module 229 prepares system status information for sharing with one or more recipients. The one or more recipients may each be associated with a messaging address, such as an email address.

The system status information may include system resource usage information which quantifies the amount of one or more system resources which are being used on the device.

The system status information may, in at least some embodiments, quantify the amount of memory resources (such as the flash memory 244 (FIG. 2), and/or RAM 246 (FIG. 2) and/or ROM 248 (FIG. 2) and/or storage memory 230 (FIG. 2)) which are currently used and/or available. The amount of memory resources used or available may be quantified in absolute or relative terms. For example, in some embodiments, the amount of memory resources may be quantified in terms of the total amount of memory used. For example, the amount of memory used or available may be quantified in terms of bytes used. In some embodiments, the amount of memory used may be quantified in terms of the amount of memory available. For example, the amount of memory available may be quantified in terms of bytes available. In some embodiments, the amount of memory used may be quantified in terms of the amount of memory available relative to the total amount of memory. For example, the amount of memory used may be quantified in terms of a percentage which represents the amount of memory used relative to the total memory capacity.

The system status information may, in at least some embodiments, quantify the amount of processing capacity of the processor 240 which is used and/or available. The amount of processing capacity may be quantified, for example, in terms of a percentage which represents the amount of processing capacity used relative to the total processing capacity available.

In at least some embodiments, the system status information may include a list of all applications currently running on the device 201. In at least some embodiments, the system status information may include a list of all processes currently running on the device 201.

Where the system status information includes a list of applications currently running on the device, the system status information may quantify the amount of system resources used by each application. For example, the system status information may indicate the total amount of memory resources used by each application. Similarly, in at least some embodiments, the system status information may indicate the total amount of processing capacity used by each application.

Where the system status information includes a list of processes currently running on the device, the system status information may quantify the amount of system resources used by each process. For example, the system status information may indicate the total amount of memory resources used by each process. Similarly, in at least some embodiments, the system status information may indicate the total amount of processing capacity used by each process.

It will be appreciated that "applications" and "processes" are related, but are, in at least some embodiments, terms which are associated with different concepts. An application is computer software or program which is designed to allow a user to perform one or more specific tasks. Applications can include, for example, games, media players, email applications, etc. Similarly, processes may include applications which are initiated by a user, but may also include subsystems or services which are managed by the operating system. In at least some embodiments, applications may include more than one associated process. That is, when an application is initiated, multiple processes associated with that application may also be initiated. Accordingly, in at least some embodiments, the terms "application" and "process" differ in that, while each term refers to a computer implemented programs, the term "process" refers to specific executable files which are executed by the device 201 and the term "application" refers to a specific computer program. In at least some embodiments, the "application" may be referred to by a name commonly associated with the application, while the "process" may be referred to by a filename associated with the process.

After the system status information is prepared for sharing (at 508), at 510, the system status information is shared. The system status information may be shared, for example, by sending the system status information to another user, system or device. By way of example, in at least some embodiments, the system status information may be sent to a device support messaging address. The device support messaging address may be an address (such as an email address) which is associated with a system administrator or other support provider for the device 201.

It will be appreciated that the method 500 of FIG. 6 (and the methods of FIGS. 7, 8, 9) may, in at least some embodiments, permit a user to specify the specific type of system status information which is to be shared. In at least some embodiments, the method 500 may include a further step (not shown) of receiving system status type information from an input mechanism 260 associated with the device 201 which allows a user to select the type of system status information which will be shared when a request to share resource information is received. That is, a user may be permitted to specify the type of system status information which is to be sent when a request to share information is received at the device in the manner described above with reference to FIG. 4 (i.e. when a user activates the selectable interface element 320). For example, the selectable interface element 908 (FIG. 5) may be used to define the type of information which will be shared.

In such embodiments, the system status information which is prepared at step 508 and sent at step 510 is system status information which corresponds to the system status type information received via the input mechanism.

Figure 7:
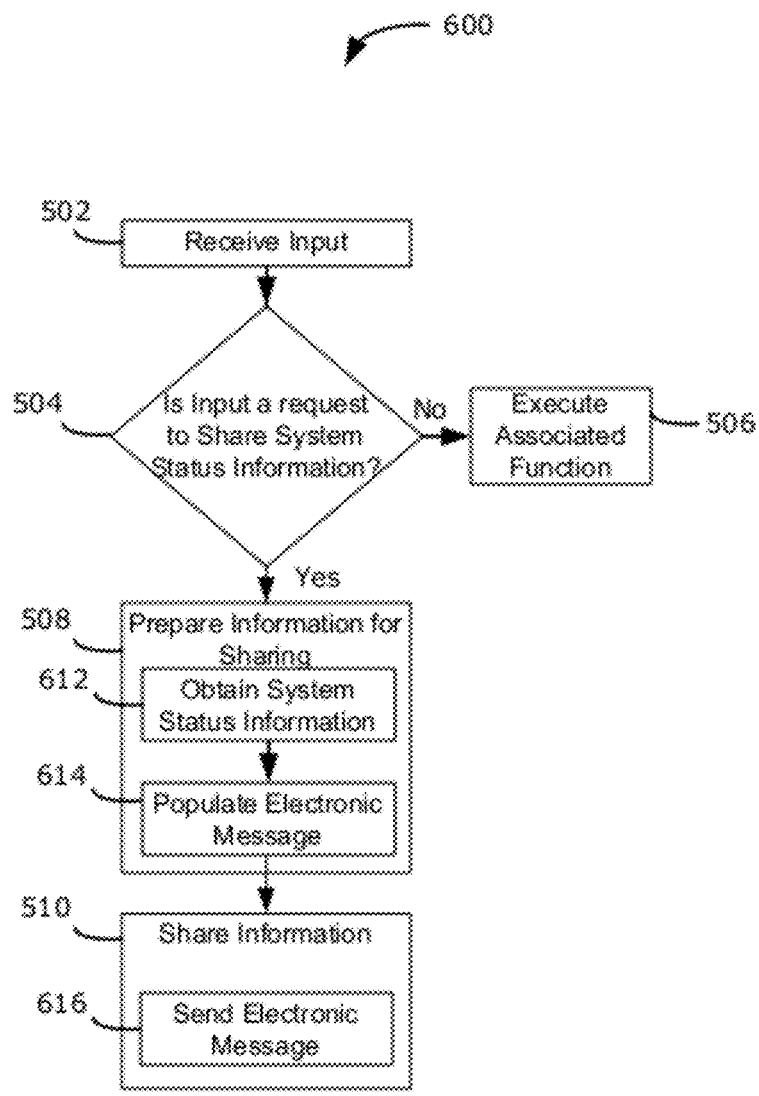
FIG. 7 is a flowchart illustrating a method for sharing system status information in accordance with example embodiments of the present disclosure.

In at least some embodiments, the system status information may be shared by way of an electronic message. That is, the system information module 229 may automatically add the system status information to an electronic message. Referring now to FIG. 7, one such embodiment is illustrated. The embodiment of FIG. 7 illustrates a further method 600 for sharing system status information.

The mobile device 201 (FIG. 2) may be configured to perform the method 600 of FIG. 7. More particularly, the system information module 229 and/or the application manager application 225 may be configured to cause one or more controllers of the device 201 (FIG. 2), such as the processor 240 (FIG. 2), to execute the steps of the method 600 of FIG. 7. In the following discussion of the method 600 of FIG. 7, reference numerals which relate to device or system components (as opposed to steps of a process or method), such as processor 240, refer to components such as those illustrated, by example, in FIGS. 1 to 5.

The method 600 of FIG. 7 includes many of the steps of the method 500 of FIG. 6. As with the embodiment of FIG. 6, the method includes (at 502), receiving an input via an input mechanism 260, and (at 504), determining whether the input is a request to share system status information. If the request is not a request to share system status information, then at 506, a function associated with the request may be performed if such a function exists. Alternatively, if the input is a request to share system status information, then at 508, the system status information is prepared for sharing and at 510, the system status information is shared. 502, 504, 506, 508 and 510 are discussed in greater detail above in the discussion of FIG. 6.

However, in the embodiment of FIG. 7, the step 508 of preparing the information for sharing includes, at 612, obtaining the system status information and, at 614, populating at least a portion of the electronic message based on the system status information.

In at least some embodiments, at 612, the system status information is obtained from an operating system 222 (FIG. 2) associated with the device 201. The operating system 222 may be configured to monitor the system resources used and/or available on the device 201. The operating system 222 may, in some example embodiments, monitor the applications which are currently running on the device 201 and the system resources used by each application running on the device. In some embodiments, the operating system may monitor the processes which are currently running on the device 201 and the system resources used by each process running on the device 201.

It will be appreciated that the specific location or component from which the system status information is obtained may vary. For example, in some embodiments, memory resources and/or the processor may be polled to determine the quantity of resources used and/or available.

At 614, at least a portion of the electronic message is populated based on the system status information. The electronic message may be populated with the system status information automatically. That is, after the request to share the system status information is received, the electronic message may be populated without the need for further input from a user.

In at least some embodiments, populating the electronic message based on the system status information includes inserting the system status information into a body of the electronic message. In at least some embodiments, the system status information may be inserted as inline text into the body of the message. The body of the electronic message is the main part of the message which generally contains the actual content of the message, as opposed to the header, which contains other information such as meta-data.

In other example embodiments, populating the electronic message based on the system status information includes inserting the system status information as an attachment to the electronic message. For example, the system status information may be stored in one or more file such as, for example, a text file, which is attached to the electronic message.

In at least some example embodiments (not shown), a subject field of the electronic message may be automatically populated with a pre-determined text string. The predetermined text string may include identification information which is associated with the device 201 and or the user of the device 201. The identification information permits a recipient of the electronic message to determine the device 201 or user associated with the electronic message. The identification information may be retrieved from a memory of the device 201. For example, in at least some embodiments, the identification information is a user name which is input by the user when the device 201 is initialized and which is stored in memory of the device 201. In other embodiments, the identification information may be a personal identification number (PIN) associated with the device 201. The PIN may be input into memory of the device 201 during manufacture of the device 201. By way of example and not limitation, in at least some embodiments, the subject of the email message may be automatically populated with the following text: "System Status Information for Device #179779".

The electronic message is, in at least some embodiments, an email message. However, in other embodiments, the electronic message may an instant message (IM). An instant message is a form of real-time direct text-based communication between two clients. In other embodiments, the electronic message may be a text message such as a short message service (SMS) message. It will be appreciated that other electronic message formats are also possible.

In at least some example embodiments, the system information module 229 may not include the ability to compose and/or send electronic messages. Instead, at 614, the system information module 229 may interact with an electronic messaging application 226 (FIG. 2) which composes the electronic message and/or transmits the electronic message to its message recipients. By way of example, in at least some embodiments (an example of which is illustrated in FIG. 2), the electronic messaging application 226 (FIG. 2) is provided with an application programming interface (API) 231. The API 231 permits other applications and modules to access at least some of the functions provided by the electronic messaging application. In at least some embodiments, the API 231 may be equipped with the ability to receive a command to compose a new electronic message and, in response to receiving such a command, cause a new electronic message to be composed. Similarly, in at least some embodiments, the API 231 may be configured to receive a command to automatically populate a portion of an electronic message with content specified by another application which is instructing the API 231. In response to receiving such a command, the API 231 may populate the specified portion of the electronic message. In at least some embodiments, the API 231 may be configured to receive a command to send the electronic message. In response to receiving such a command, the API 231 may send the electronic message to its message recipients.

Accordingly, in at least some embodiments, the step 614 of automatically populating the electronic message (FIG. 7) may include a step of invoking an electronic messaging application. Invoking an electronic messaging application may involve initiating an electronic messaging application if the electronic messaging application is not already running.

In at least some embodiments, the step of invoking the electronic messaging application may occur after obtaining the system status information (at 612). By invoking the electronic messaging application after the system status information is already obtained, the system status information is reported in a manner in which it is not affected by the electronic messaging application, if the electronic messaging application is not already running.

Similarly, the step 614 of automatically populating the electronic message may include a step of sending a command to the API 231 to instruct the API 231 to automatically populate the electronic message with specified content. That is, the system status information may be passed to the API 231 from the system information module 229 together with an instruction to populate the electronic message with the system status information. In response to receiving such an instruction, the API 231 may cause the electronic messaging application 226 to populate the electronic message with the specified information.

In at least some embodiments, the electronic message may also be automatically populated with a date and/or time when the system status information was generated.

In the embodiment of FIG. 7, the step 510 of sharing information includes a step 616 of sending the electronic message. The message may be sent to one or more message recipient identified in a message recipient field associated with the electronic message. The message recipient field may be a "To" field, a carbon copy "Cc" field, and/or a blind carbon copy "Bcc" field. The electronic message may be sent from the device 201 to its intended message recipients, through the network 124, in the manner described in the discussion of FIG. 1 above.

In at least some embodiments, the messaging address to which the electronic message may be sent may be specified by a user of the device 201. An example of one such embodiment is illustrated in FIG. 8.

Figure 8:
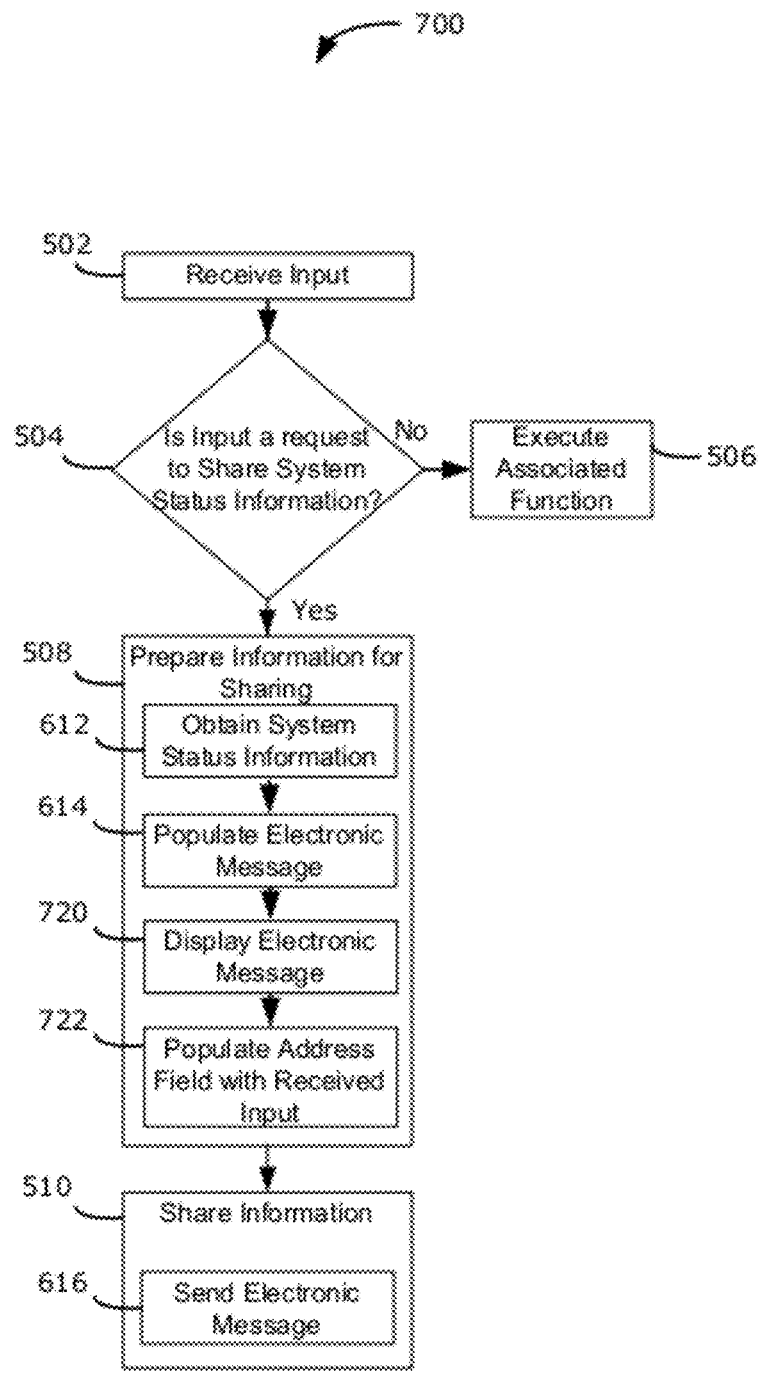
FIG. 8 is a flowchart illustrating a method for sharing system status information in accordance with example embodiments of the present disclosure.

The embodiment of FIG. 8 illustrates a further method 700 for sharing system status information.

The mobile device 201 (FIG. 2) may be configured to perform the method 700 of FIG. 8. More particularly, the system information module 229 and/or the application manager application 225 may be configured to cause one or more controllers of the device 201 (FIG. 2), such as the processor 240 (FIG. 2), to execute the steps of the method 700 of FIG. 8. In the following discussion of the method 700 of FIG. 8, reference numerals which relate to device or system components (as opposed to steps of a process or method), such as processor 240, refer to components such as those illustrated, by example, in FIGS. 1 to 4.

The method 700 of FIG. 8 includes many of the steps 502, 504, 506, 508, 612, 614, 510, 616 of the method 600 of FIG. 7. The steps 502, 504, 506, 508, 612, 614, 510, 616 are discussed above in greater detail with respect to FIGS. 6 and 7.

In the embodiment of FIG. 8, the method 700 includes a further step 720 of displaying the electronic message. The electronic message may be displayed in the display 204 (FIG. 2) associated with the device 201.

After the electronic message is displayed, an electronic messaging application 226 (FIG. 2) may permit users of the device 201 to modify the electronic message. For example, a user of the device 201 may interact with the input mechanism 260 (FIG. 2) associated with the device 201 to input additional information into the electronic message.

In at least some embodiments, at step 722, a user may input a recipient messaging address. The recipient messaging address may be input into a message recipient address field of the electronic message. The message recipient address field may be a "To" field, a carbon copy "Cc" field, and/or a blind carbon copy "Bcc" field.

In other embodiments, the message recipient address field may be automatically populated without user input. An example of one such embodiment is illustrated in FIG. 9.

Figure 9:
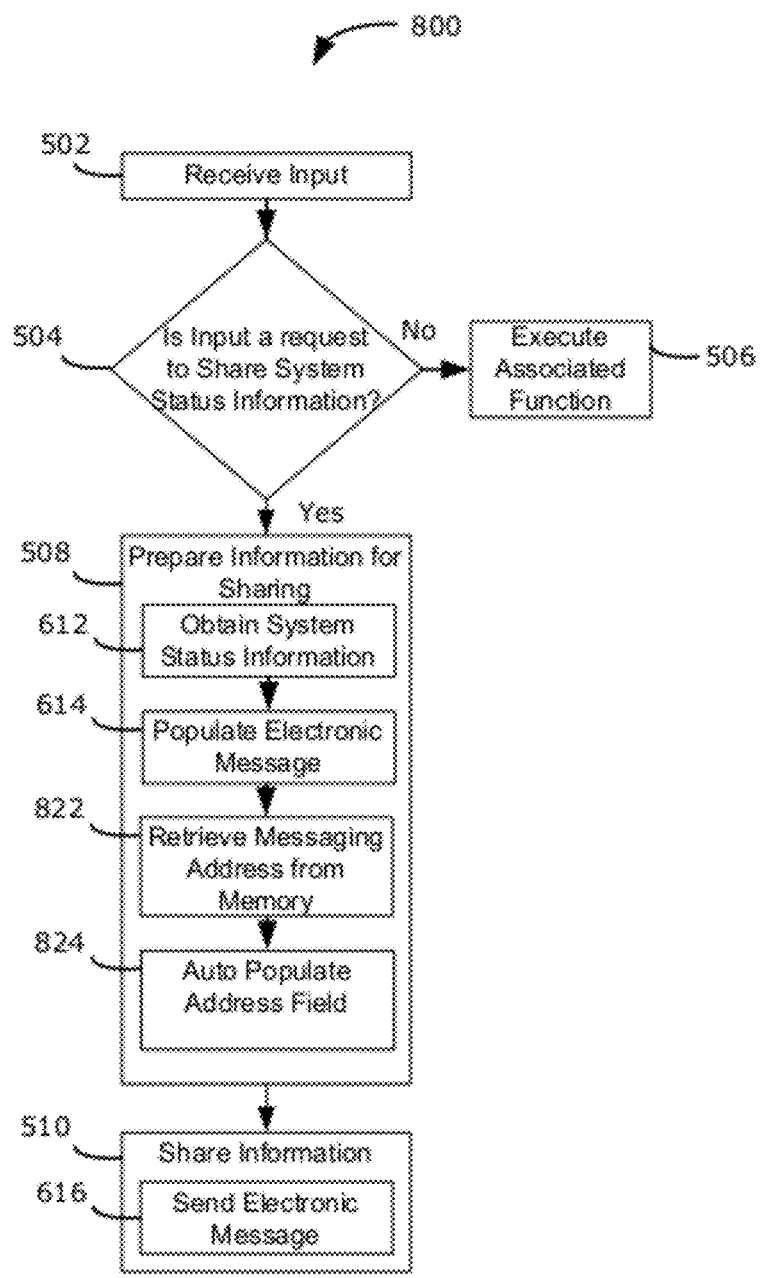
FIG. 9 is a flowchart illustrating a method for sharing system status information in accordance with example embodiments of the present disclosure.

The embodiment of FIG. 9 illustrates a further method 800 for sharing system status information.

The mobile device 201 (FIG. 2) may be configured to perform the method 800 of FIG. 9. More particularly, the system information module 229 and/or the application manager application 225 may be configured to cause one or more controllers of the device 201 (FIG. 2), such as the processor 240 (FIG. 2), to execute the steps of the process 800 of FIG. 9. In the following discussion of the method 800 of FIG. 9, reference numerals which relate to device or system components (as opposed to steps of a process or method), such as processor 240, refer to components such as those illustrated, by example, in FIGS. 1 to 5.

The method 800 of FIG. 9 includes many of the steps 502, 504, 506, 508, 612, 614, 510, 616 of the method 600 of FIG. 7. The steps 502, 504, 506, 508, 612, 614, 510, 616 are discussed above in greater detail with respect to FIGS. 6 and 7.

However, in the embodiment of FIG. 9, the method 800 includes a further step 822 of retrieving a messaging address from a memory of the device 201. The messaging address may be a device support messaging address 227 (FIG. 2) which is stored in memory of the device 201. The device support messaging address may be a messaging address associated with customer support, a system administrator, or another support provider.

In the embodiment of FIG. 9, the device support messaging address is retrieved from memory (step 822) and is used (at step 824) to automatically populate a message recipient field of the electronic message. The message recipient field may be a "To" field, a carbon copy "Cc" field, and/or a blind carbon copy "Bcc" field.

Electronic Message Composition Screen

Figure 10:
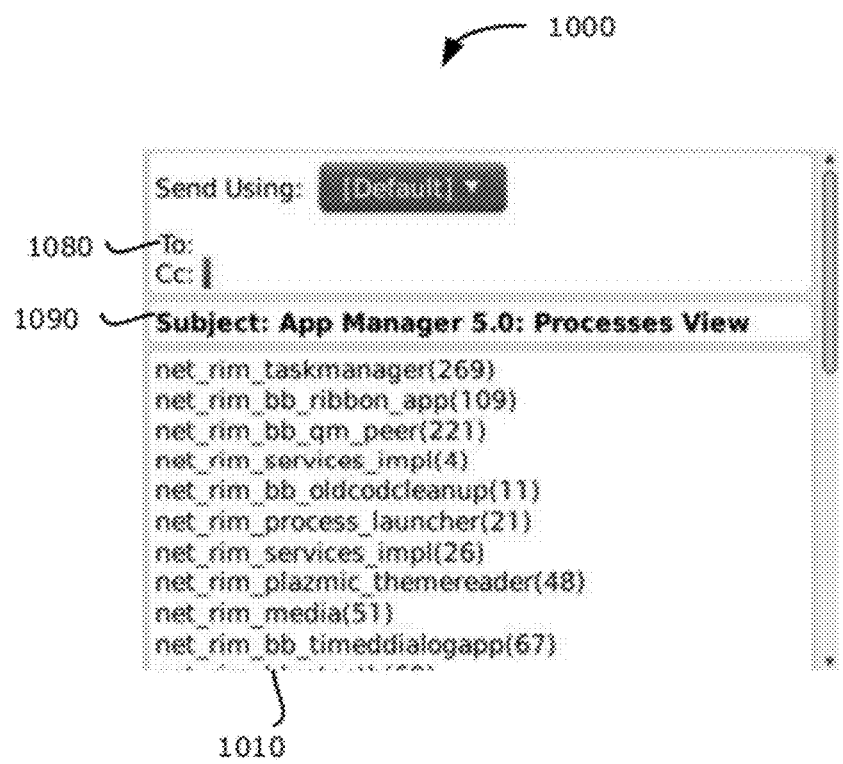
FIG. 10 is an example electronic message composition screen in accordance with example embodiments of the present disclosure.

Referring now to FIG. 10, an example electronic message composition screen 1000 is illustrated. The electronic message composition screen 1000 includes a message recipient field 1080, a subject field 1090, and a message body 1010. The message body field has been automatically populated with system status information in the manner described above. In the example illustrated, the subject field has been automatically populated with a subject in the manner described above. The subject field has been automatically populated to include a description of the type of system status information which is included in the electronic message (i.e. "Processes View"). In accordance with further example embodiments of the present disclosure, a development tool is provided for developing applications which interact with the API 231. The development tool provides assistance to developers, in the form of prompts on a display associated with a computer used by a developer, to develop applications which interact with the API 231. The development tool may, among other things, provide a list of functions provided by the API 231 and a description of the syntax of requests to the API 231 and a description of the meaning of values returned from the API 231.

In accordance with further embodiments of the present disclosure, there are provided a computer program product comprising a computer readable medium having stored thereon computer executable instructions comprising instructions for practising the methods of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

While the present disclosure is primarily described as a method, a person of ordinary skill in the art will understand that the present disclosure is also directed to various apparatus such as a mobile wireless device for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

FIGS. 6-9 are flowcharts of example embodiment methods. Some of the steps illustrated in the flowchart may be performed in an order other than that which is described. Also, it should be appreciated that not all of the steps described in the flow chart are required to be performed, that additional steps may be added, and that some of the illustrated steps may be substituted with other steps.

The invention claimed is:

1. A method implemented by a communication device for sharing system status information associated with the communication device, the method comprising:
   receiving, from an input mechanism of the communication device, a request to transmit system status information associated with the communication device to one or more recipients;
   receiving, from the input mechanism, a selection of a type of system status information to transmit to the one or more recipients; and
   in response to receiving the request to transmit the system status information:
      obtaining system status information associated with the communication device by polling a resource on the communication device associated with the selected type of system status information, the system status information quantifying current use or availability of the resource;
      automatically populating one or more portions of an electronic message based on the system status information; and
      automatically retrieving a messaging address from a memory associated with the communication device and populating an address field of the electronic message with the messaging address,
   wherein the system status information comprises processor usage information for the communication device, and wherein the input mechanism is configured to be engaged by a user of the communication device.

2. The method of claim 1 wherein the system status information further comprises memory usage information.

3. The method of claim 1, wherein the system status information includes a list of applications running on the communication device.

4. The method of claim 3, wherein the processor usage information indicates an amount of processor processing capabilities used by one or more of the applications running on the communication device.

5. The method of claim 1, further comprising, in response to receiving the request to transmit the system status information, invoking an email application associated with the communication device.

6. The method of claim 1, further comprising: sending the electronic message to one or more recipients.

7. The method of claim 1, further comprising: displaying the electronic message on a display screen associated with the communication device.

8. The method of claim 1, wherein automatically populating one or more portions of the electronic message comprises sending a command to an application programming interface associated with an email application to automatically populate an email message.

9. The method of claim 1, wherein automatically populating one or more portions of the electronic message based on the system status information comprises inserting the system status information in a body of the electronic message.

10. The method of claim 1, further comprising: displaying a selectable interface element for inputting a request to transmit system status information.

11. A communication device comprising:
   at least one processor;
   at least one memory storing computer executable instructions, the computer executable instructions being configured to cause the at least one processor to:
      receive, from an input mechanism of the communication device, a request to transmit system status information associated with the communication device to one or more recipients;
      receive, from the input mechanism, a selection of a type of system status information to transmit to the one or more recipients; and
      in response to receiving the request to transmit the system status information:
         obtain system status information associated with the communication device by polling a resource on the communication device associated with the selected type of system status information, the system status information quantifying current use or availability of the resource;
         automatically populate one or more portions of an electronic message based on the system status information; and
         automatically retrieve a messaging address from the memory and populate an address field of the electronic message with the messaging address,
      wherein the system status information comprises processor usage information for the communication device, and wherein the input mechanism is configured to be engaged by a user of the communication device.

12. The communication device of claim 11 wherein the system status information further comprises memory usage information.

13. The communication device of claim 11, wherein the system status information includes a list of applications running on the communication device.

14. The communication device of claim 13, wherein the processor usage information indicates an amount of processor processing capabilities used by one or more of the applications running on the communication device.

15. The communication device of claim 11, wherein the computer executable instructions are further configured to cause the processor to:
in response to receiving the request to transmit the system status information, invoke an email application associated with the communication device.

16. The communication device of claim 11, wherein the computer executable instructions are further configured to cause the processor to:
send the electronic message to one or more recipients.

17. The communication device of claim 11, further comprising a display, and wherein the computer executable instructions are further configured to cause the processor to: display the electronic message on the display.

18. The communication device of claim 11, wherein automatically populating one or more portions of the electronic message comprises sending a command to an application programming interface associated with an email application to automatically populate an email message.

19. The communication device of claim 11, wherein automatically populating one or more portions of the electronic message based on the system status information comprises inserting the system status information in a body of the electronic message.

20. The communication device of claim 11, further comprising a display and wherein the computer executable instructions are further configured to cause the processor to:
display, on the display, a selectable interface element for inputting a request to transmit system status information.

* * * * *